May 1, 1951   E. G. SPANGLER   2,550,942
METERING AND DISPENSING CONTROL SYSTEM
Filed May 5, 1947
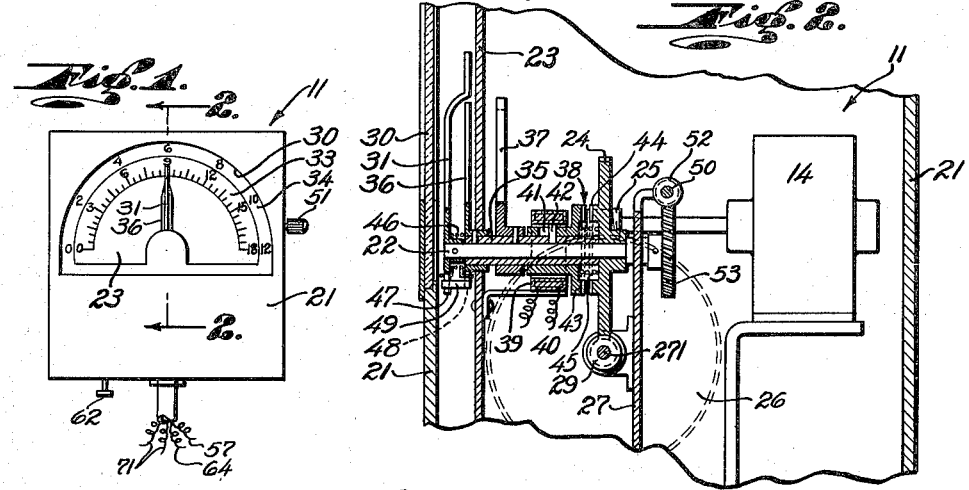
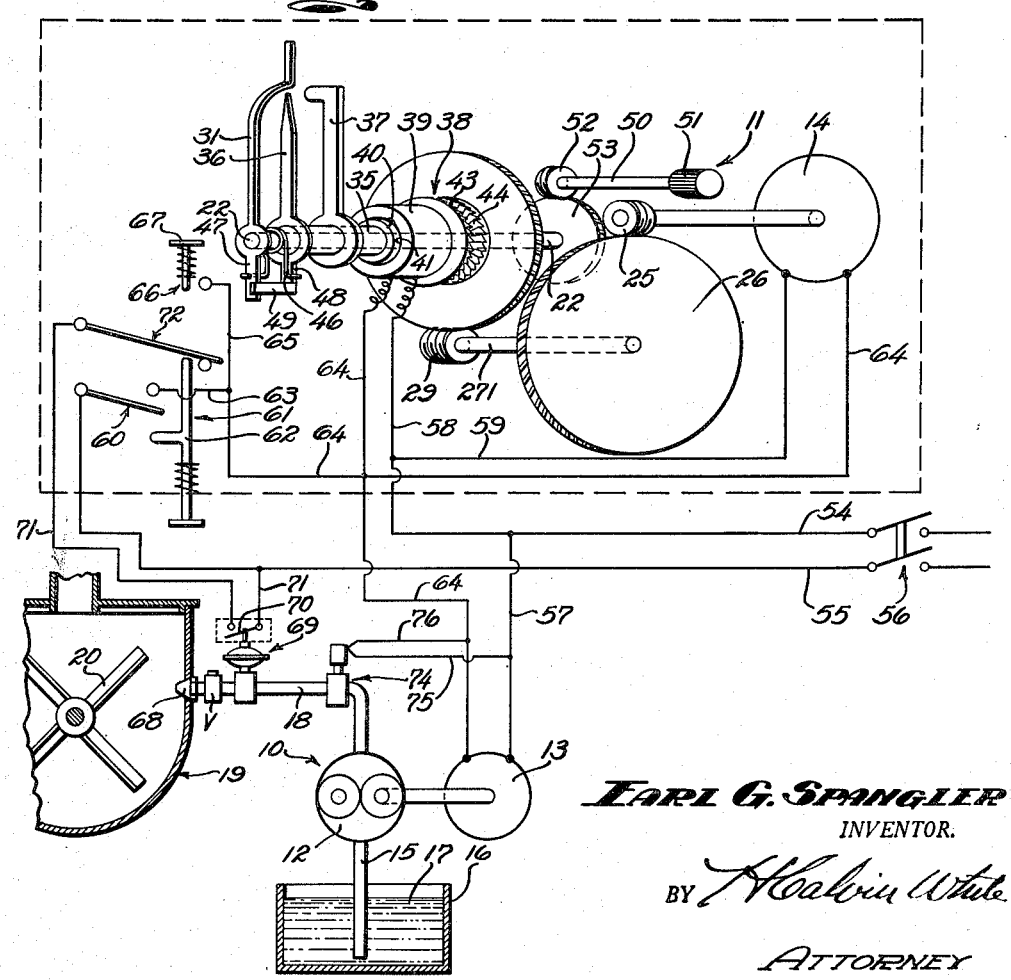
Earl G. Spangler
INVENTOR.
BY H. Calvin White
ATTORNEY Patented May 1, 1951

2,550,942

UNITED STATES PATENT OFFICE 2,550,942

METERING AND DISPENSING CONTROL SYSTEM

Earl G. Spangler, Seal Beach, Calif.

Application May 5, 1947, Serial No. 746,043

6 Claims. (Cl. 222—70)

This invention has to do with control systems for accurately metering and dispensing fluids, particularly where it is necessary or desirable to effect the control at a station remote from the metering and dispensing location.

The invention has special applicability for a wide variety of uses requiring accuracy of metering of a fluid, e. g. to be combined with other materials in manufacturing processes, and where exactness of control with respect to the quantity of fluid dispensed is essential because of such considerations as high cost of the fluid and therefore the necessity of avoiding excess use or wastage, or because of requirements for exactness in proportioning. As an example, the invention has been found highly successful for accurately metering and dispensing expensive vitamin oils for admixture with other ingredients of animal foods. And as indicated, the present system is of further and particular advantage for installations requiring remote control of the fluid metering and dispensing.

Generally speaking, the invention is predicated upon the use of a metering pump of any suitable positive displacement type operable to deliver the same predetermined quantity of fluid for each cycle of the pump operation, and a remote control capable of manual setting in accordance with a predetermined number of pump operating cycles, and of discontinuing the delivery of useable fluid by the pump after it has operated a corresponding number of cycles. Ordinarily the pump will be operated by an electric motor, with the control functioning to start and stop the motor in accordance with the required cycles of the pump operation.

In its adaptation for being stationed remotely from the pump, the control employs a movable element driven by a motor operating in synchronism with the pump motor, through a range predetermined by the manual setting. Thus by virtue of such setting, the control element is caused to discontinue the useable fluid discharge by the pump, preferably by de-energizing the synchronized pump and control motors, upon completion of a predetermined number of rotations of the control motor, and therefore of the synchronized pump motor. As will appear, the control is capable of being set, independently of the driving motor, to whatever position desired for correspondence with the required cycles of pump operation, and then of functioning to maintain the effective pump operation through exactly the set range.

Additional features of the system have to do with secondary controls whereby the pump outlet line is closed automatically upon completion of the metering cycles, and sustained closing of the motor circuits may be made dependent upon the availability of fluid supply to the metering pump.

All the above mentioned features of the invention as well as additional objects and the details of an illustrative embodiment, will be more fully understood from the following description of the accompanying drawing, in which:

Fig. 1 is an elevational view of the indicator panel;

Fig. 2 is an enlarged cross-sectional view of the remote control, taken on line 2—2 of Fig. 1; and Fig. 3 is a diagrammatic view, partly in perspective, illustrative of the entire metering and control system.

Referring first to Fig. 3, the system comprises a metering pump unit generally indicated at 10, functioning as previously described to deliver per cycle of operation a predetermined quantity of fluid, and a control mechanism generally indicated at 11, capable of being stationed at a remote location and operable by manual setting to cause the metering pump to operate an exact number of cycles in accordance with the control setting.

It will be understood that the metering pump may be of any suitable positive displacement type capable of delivering on each cycle of its operation an exact quantity of the fluid. Typically the rotary metering pump 12 is shown to be of a positive displacement gear type driven by a motor 13 so related to the control motor 14 as to rotate in synchronism therewith. Such relation preferably is maintained by using synchronous motors, the relative speeds of which are constant for all cycles of energizing current. The pump 10 is shown to take suction through line 15 from an appropriate vessel 16 containing the liquid 17 to be dispensed, and to discharge the liquid through line 18 into a mixer 19 containing an agitator 20 operating to uniformly distribute the liquid throughout the material with which it is to be mixed.

Referring to Figs. 1 and 2, the control mechanism 11 contained within a suitable housing 21, comprising a shaft 22 extending through the indicator panel 23 and carrying a gear 24 driven by motor 14 at a greatly reduced speed ratio, for example of about 3600 to 1. The motor-to-shaft drive is shown conventionally to comprise a motor shaft worm 25 meshing with gear 26 on shaft 271 supported by wall 27, and carrying a worm 29 driving the gear 24.

The shaft 22 carries between panel 23 and a window 30 in the housing 21 an indicator 31 which shows the angular position of the shaft with relation to arcuate scales 33 and 34 on the panel 23, scale 33 being calibrated in terms of operating cycles of the metering pump 12, and scale 34 showing corresponding values for the quantities or volumes of the liquid displaced by the pump. Being fixed to the shaft 22, indicator 31 traverses the scale in direct relation to the number of rotations of the synchronized motors 13 and 14, and therefore in direct relation to the number of metering pump operating cycles.

Shaft 22 carries a sleeve 35 to the outer end of which is attached an indicator 36 rotatable, with the sleeve, relative to the shaft and indicator 31. The sleeve carries at the inside of the panel 23 a control element 37 in the form of a switch actuating arm having the later described action in relation to the range or angularity of the simultaneous shaft and sleeve rotation. The rotative drive of sleeve 35 by shaft 22 or the gear 24, is controlled by a clutch 38, for example of a solenoid actuated type comprising an annular field winding 39 surrounding a core sleeve 40 having a longitudinal slot 41 receiving a pin 42 carried by sleeve 35, the core sleeve being axially movable in response to energization of the coil 39. Sleeve 40 has a toothed surface 43 engageable with a corresponding surface 44 on the gear 24, as the surfaces are brought together against the resistance of spring 45 which normally maintains them in the disengaged relation shown in Fig. 2. As best illustrated in Fig. 3, rotation of sleeve 35 and the parts carried thereby, relative to shaft 22 and the indicator 31, is resisted by a spring 46 terminally engaging a projection 47 on indicator 31, and an extension 48 of the indicator 36. Relative rotation of the indicators in an opposite direction is arrested by engagement of arm 49 on the extension 48, with projection 47.

Provision is made for manually adjusting or setting the angular position of shaft 22, indicators 31 and 36, and the control element 37. Such setting may be effected by a stem 50 having a knurled head 51 and carrying a worm 52 meshing with gear 53 on the end of shaft 22. With the clutch 38 disengaged, stem 50 may be manually turned to rotate shaft 22 and indicator 31 to any selected position along the dial markings.

Current is supplied to the control system through lines 54 and 55 in which is placed the switch 56. The line 54 connects through 57 and 58 with metering pump motor 13 and clutch coil 39, and through line 59 with the motor 14. Line 55 runs to a self-opening (momentarily closed) switch 60, and through switch 60 with a double throw toggle switch conventionally indicated at 72 and manually closeable by the throw element 62. Switch 60 connects through lines 63 and 64 with motors 14 and 13, and clutch coil 39, and through line 65 with the stationary pole of switch 72. Throw element 67 is engageable by arm 37 to open the switch, as and in the manner later explained.

It may be desirable to prevent operation of the control system, including the motors, should for any reason there be a failure of the liquid supply to the metering pump. For this purpose I may provide a secondary control of any type responsive to the pump outlet pressure, which serves generally to permit energization of the circuits when the pump is taking liquid, but to keep the circuits open upon failure of the liquid supply. Referring again to Fig. 3, liquid delivery from line 18 into the mixer 19 may occur through a nozzle 68 at the delivery side of which is placed a pressure responsive, diaphragm type control 69 operable to close a normally open switch 70 in line 71 leading to the movable contactor of switch 72. When the pump 12 is delivering liquid, the outlet pressure will be sufficient to exert and maintain, through the control 69, a closing force on switch 70. If the pump is not delivering liquid, the switch will remain open. A spring loaded check valve V, opening with the fluid flow during operation of the metering pump, may be placed in line 18 to maintain liquid in the line between the valve and pump.

It may also be desirable to provide in the discharge line 18 a shut-off valve which, instantly upon completion of the cycle range for which the pump is set to operate, will serve the dual purposes of completely discontinuing any liquid delivery from the pump, and of imposing a fluid resistance causing stoppage of the pump. For this purpose I may place in line 18, preferably between control 69 and the pump, a normally closed solenoid actuated valve 74 connected by conductors 75 and 76 with lines 57 and 64.

In considering the operation of the system, assume that it is desired to deliver to the mixer 19 a quantity of the liquid 17 corresponding to the displacement of 90 cycles or revolutions of the metering pump 12. Clutch 38 being disengaged, shaft 22 and indicator 31 may be rotated by the stem 50 to the dial position shown in Fig. 1. Since spring 46 tends to maintain arm 49 in engagement with the extension 47 of indicator 31, the described setting will also rotate sleeve 35, element 37 and the indicator 36 to a degree correspondingly exactly to the position of indicator 31. The control is now preset to cause the metering pump to operate through a range of 90 cycles.

By manually throwing the switch element 62, both sides 60 and 72 of the switch 61 are closed to simultaneously energize the motors 13 and 14 and throw the clutch 38 so that the drive from gear 24 is transmitted directly through the clutch to sleeve 40. By momentarily holding the throw element 62 closed, the element may thereafter return to open position with switch 72 remaining closed providing switch 70 is closed by the pressure responsive control 69. Thus if the metering pump is not displacing liquid, switch 70 will remain open and the circuits de-energized. Assuming switches 72 and 70 to remain closed, the drive transmitted from motor 14 rotates indicator 36 and the control arm 37 counterclockwise in the aspect of Fig. 1, while indicator 31 retains its original set position at 90 cycles. When indicator 36 and arm 37 reach 0 position, at which point the pump will have operated 90 cycles, the arm engages element 67 to open the switch 72 and simultaneously de-energize the motor and clutch circuits. Then, as previously indicated, valve 74 closes to cut off the pump discharge. Upon disengagement of the clutch, spring 46 returns indicator 36 and arm 37 to their starting positions of correspondence with indicator 31. The described operation then may be repeated at the same initial settings of the indicators and control arm 37, or at whatever different setting desired in accordance with the quantity of fluid to be dispensed by the pump.

I claim:

1. A control system comprising a metering pump operable to deliver for use a predetermined quantity of material for each cycle of the pump operation, a motor for driving said pump, mechanism for controlling the delivery of useable material by the pump, said mechanism comprising a settable control adapted to be selectively positioned in accordance with a predetermined number of pump operating cycles, a second motor for said control and operating in synchronism with the pump motor, a driving connection between said control and second motor and comprising means for setting the position of the control independently of its connection with the motor, and means operable in accordance with the position of said control to discontinue the useable material delivery by the pump after it has operated said predetermined number of cycles.

2. A control system comprising a metering pump operable to deliver for use a predetermined quantity of material for each cycle of the pump operation, a motor for driving said pump, mechanism for controlling the operation of the pump, said mechanism comprising a settable control adapted to be selectively positioned in accordance with a predetermined number of pump operating cycles, a second motor for said control and operating in synchronism with the pump motor, a driving connection between said control and second motor and comprising means for setting the position of the control independently of its connection with the motor, and means operable in accordance with the position of said control to discontinue the operation of said motors after the pump has operated said predetermined number of cycles.

3. A control system comprising a metering pump operable to deliver for use a predetermined quantity of material for each cycle of the pump operation, a motor for driving said pump, mechanism for controlling the operation of the pump, said mechanism comprising a settable control adapted to be selectively positioned in accordance with a predetermined number of pump operating cycles, a second motor for said control and operating in synchronism with the pump motor, said control comprising an electric switch, a movable element operable to actuate said switch, a driving connection between said second motor and element, and means for manually setting the position of said element independently of said second motor, said element being operable to actuate said switch to discontinue the operation of said motors after the pump has operated said predetermined number of cycles.

4. A control system comprising a metering pump operable to deliver for use a predetermined quantity of material for each cycle of the pump operation, a motor for driving said pump, mechanism for controlling the operation of the pump, said mechanism comprising a settable control adapted to be selectively positioned in accordance with a predetermined number of pump operating cycles, a second motor for said control and operating in synchronism with the pump motor, said control comprising an electric switch, a movable element operable to actuate said switch, a driving connection between said second motor and element, a clutch in said driving connection disengageable upon actuation of said switch, a valve operable upon actuation of said switch to close off fluid delivery by said pump, and means for manually setting the position of said element independently of said second motor, said element being operable to actuate said switch, to discontinue the operation of said motors and to also effect disengagement of said clutch and operation of said valve to close off said fluid delivery, after the pump has operated said predetermined number of cycles.

5. A control system comprising a metering pump operable to deliver for use a predetermined quantity of material for each cycle of the pump operation, an electric motor for driving said pump and having an energizing circuit, mechanism for controlling the operation of the pump, said mechanism comprising a settable control adapted to be selectively positioned in accordance with a predetermined number of pump operating cycles, a switch in said energizing circuit and operable in accordance with the position of said control to deenergize said motor after the pump has operated said predetermined number of cycles, a second switch in said energizing circuit in series with the first mentioned switch, and means responsive to the pump discharge pressure for closing said second switch when said pump is delivering material.

6. A control system comprising a metering pump operable to deliver for use a predetermined quantity of material for each cycle of the pump operation, a synchronous motor for driving said pump, mechanism for controlling the operation of the pump, said mechanism comprising a settable control adapted to be selectively positioned in accordance with a predetermined number of pump operating cycles, a second synchronous motor for said control and operating in synchronism with the pump motor, a common electrical circuit for said motors, a switch in said circuit and operable in accordance with the position of said control to deenergize the motors after the pump has operated a predetermined number of cycles, a second switch in said circuit in series with the first mentioned switch, and means responsive to the pump discharge pressure for closing said second switch when said pump is delivering material.

EARL G. SPANGLER.

REFERENCES CITED

The following references are of record in the file of this patent:

UNITED STATES PATENTS

| Number | Name | Date |
| --- | --- | --- |
| 1,046,053 | Bowser | Dec. 3, 1912 |
| 1,328,101 | Pressler | Jan. 13, 1920 |
| 1,974,857 | Winton | Sept. 25, 1934 |
| 2,018,538 | Webb | Oct. 22, 1935 |
| 2,116,777 | Brayer | May 10, 1938 |
| 2,319,444 | Crosby | May 18, 1943 |